United States Patent [19]

Depetris et al.

[11] 4,370,445

[45] Jan. 25, 1983

[54] POLYURETHANE-BASE MATERIAL SUITABLE FOR USE FOR MAKING FIRE ARRESTING WALLS

[75] Inventors: Norbert Depetris, Carry le Rouet; Claude Bovis, Martigues, both of France

[73] Assignee: Chloe-Chimie, Paris, France

[21] Appl. No.: 206,347

[22] Filed: Nov. 13, 1980

[30] Foreign Application Priority Data

Jun. 7, 1979 [FR] France ............................... 79 14522

[51] Int. Cl.$^3$ ..................... C08G 18/32; C08L 75/12
[52] U.S. Cl. .................... 524/742; 524/792; 524/871; 524/874; 528/77; 528/78
[58] Field of Search ................. 528/77, 78; 260/37 N; 524/742, 792, 871, 874

[56] References Cited

U.S. PATENT DOCUMENTS 3,876,568  4/1975  Wysocki ........................... 260/37 N
4,251,428  2/1981  Recker et al. ........................ 528/77

FOREIGN PATENT DOCUMENTS 1499352  10/1967  France .
1107237  3/1968  United Kingdom .

OTHER PUBLICATIONS

*Chemical Abstracts*, vol. 94, 1981, p. 48, Abstract No. 122589k, Yamada, Taku, "Encapsulating Compositions for Fire Proofing Polyurethane Foams".

*Primary Examiner*—Wilbert J. Briggs, Sr.
*Assistant Examiner*—Robert E. L. Sellers
*Attorney, Agent, or Firm*—McDougall, Hersh & Scott

[57] ABSTRACT

The invention concerns a material having good resistance to mechanical stresses and heat and in particular having substantial resistance to the penetration of a directed flame such as the pointed flame of a blowpipe.

The material comprises a substance which can be polymerized such as a polyurethane, sulfur, and possibly halogenated compounds, phosphorus-bearing compounds, phosphohalogenated compounds, trivalent antimony oxide, solid or liquid fillers and pigments.

The material may be used for the production of strong walls, in particular by filling internal cavities of armoured doors, walls of strong rooms or safes.

11 Claims, No Drawings

POLYURETHANE-BASE MATERIAL SUITABLE FOR USE FOR MAKING FIRE ARRESTING WALLS

The invention concerns a material enjoying good resistance to mechanical stresses and to heat and in particular having substantial resistance to the penetration of a directed flame such as a pointed blowpipe flame. By virtue of these qualities, the material has good resistance to house-breaking or burglary and can be used for the formation of strong walls, in particular by filling internal cavities of armoured doors, walls of strong rooms or safes.

It is known for doors or walls of strong-rooms or safes to be reinforced by means of armouring plates made of an elastomeric material which do not intimately adhere to the door or wall; such plates do not provide sufficient resistance to burglary.

The present invention is directed to a material having good resistance to mechanical stresses and to heat, characterised in that it essentially comprises for 100 parts by weight of the material, from 30 to 70 parts by weight of a substance which can be polymerized, such as a cast resin or a thermosetting resin and one or more of the following additional constituents:

from 10 to 60 parts by weight (preferably from 20 to 30 parts by weight) of divided sulphur,
from 0 to 15 parts by weight (preferably from 5 to 10 parts by weight) of halogenated compounds, phosphorus-bearing compounds and/or phosphohalogenated compounds,
from 0 to 5 parts by weight of trivalent antimony oxide, and
from 0 to 50 parts by weight (preferably from 5 to 25 parts by weight) of solid powdery fillers and/or liquid fillers and/or pigments.

The substance which can be polymerized can be constituted by one component or it can be formed by the reaction of two or more components; the substance is preferably a polyurethane which is produced by the reaction on the one hand of one or more organic polyisocyanates and on the other hand one or more compounds comprising from 3 to 8 atoms of labile hydrogen per molecule, the mean equivalent weight of which is from 100 to 400 and preferably from 200 to 300, such compounds being reacted with the polyisocyanates in amounts such that the isocyanate number is from 1 to 1.5.

The compounds which comprise from 3 to 8 labile hydrogen atoms per molecule preferably comprise polyetherpolyols which are prepared in known manner by the polyaddition of propylene oxide and possibly ethylene oxide on compounds such as polyols, glucosides, alkanolamines or polyamines, such compounds having from 3 to 8 hydrogen atoms capable of reacting with the alkylene oxides. The polyaddition operation is most frequently performed in the presence of an alkaline compound such as potassium hydroxide until the required amount of the alkylene oxide or oxides has reacted. The alkaline compound is then removed for example by neutralisation of that compound by means of an acid, and then by filtration of the salt formed. When the polyetherpolyols are prepared from ethylene oxide and propylene oxide, such alkylene oxides may be fixed separately or in mixture on the compounds having the labile hydrogen atoms, or by alternating the two fixing methods referred to above.

The compounds which comprise from 3 to 8 labile hydrogen atoms per molecule may also comprise a mixture of polyether-polyols as defined above, and amino compounds such as diethanolamine, ethylenediamine, diethylenetriamine, tolylenediamines and diphenylmethanediamines.

The organic polyisocyanates are preferably selected from aromatic polyisocyanates such as tolylenediisocyanate which is generally referred to as 'TDI' or 4,4'-diphenylmethanediisocyanate, which is generally referred to as 'MDI'. The organic polyisocyanates may also comprise crude TDI which are produced by the reaction of phosgene on a crude tolylenediamine containing various condensed amines and isomers, or crude MDI which result from the condensation of phosgene on the unpurified product of the reaction between aniline and formaldehyde. Such polyisocyanates may be used directly or in the form of prepolymers produced by the reaction of the organic polyisocyanates described hereinbefore, with, in an amount of from 30 to 70% of the stoichiometric amount, one or more compounds comprising from 2 to 8 atoms of labile hydrogen per molecule, such as for example tripropyleneglycol, polyoxypropylene triols with an equivalent weight of 1000, or products of the polyaddition of propylene oxide on sorbitol, having an equivalent weight of 240.

The mean equivalent weight of a compound comprising labile hydrogen atoms corresponds to the ratio of its mean molecular weight to the mean number of labile hydrogen atoms in its molecule.

The isocyanate number as referred to hereinbefore is equal to the ratio of the number of isocyanate groups of the organic polyisocyanates, to the number of labile hydrogen atoms of the compounds comprising from 3 to 8 thereof per molecule.

The halogenated compounds which are capable of being included in the composition of the materials of the invention may comprise for example chlorinated paraffins, chlorinated diphenyl or dibromopropanol. The phosphorus-bearing compounds may comprise for example triammonic phosphate, triphenyl phosphate or triphenyl phosphite. Such phosphorus-bearing compounds may also comprise phosphorus-bearing polyols which are produced for example by the polyaddition of propylene oxide and, if appropriate, ethylene oxide, on an ester of phosphoric acid or a polyphosphoric acid or equally, on a nitrogen derivative of phosphoric acid such as phosphoramide; the phosphorus-bearing polyols react with the organic polyisocyanates and are therefore capable of totally or partially replacing the compounds which comprise from 3 to 8 labile hydrogen atoms per molecule. The phosphohalogenated compounds may for example comprise trichloroethyl phosphate; trichloropropylphosphate or tribromopropylphosphate. The halogenated, phosphorus-bearing or phosphohalogenated compounds provide the materials according to the invention with increased resistance to penetration by the flame of a blowpipe because they repeatedly cause extinction of the blowpipe flame.

It is advantageous, particularly when the materials of the invention contain halogenated or phosphohalogenated compounds, for trivalent antimony oxide also to be introduced therein. The effect of this additive is to increase the resistance of the materials to heat.

The solid powdery fillers which are suitable for being contained in the materials of the invention may comprise in particular chalk powder, kaolin, silica and barium sulphate. The liquid fillers may comprise esters such as dioctylphthalate or heavy petroleum oils such as oils referred to as 'aromatic extracts' which are sold for example by Société Française des Pétroles BP under the mark IRANOLIN. The pigments may comprise for example carbon black or yellow or red iron oxides.

The materials of the invention are prepared by casting, in a mould or in the internal cavities of the members to be protected, a liquid which is produced by mixing the constituents thereof, before reaction between the component or components of the substance which can be polymerized, such as the organic polyisocyanates and the hydroxyl compounds, has resulted in the formation of a solid material.

When the substance which can be polymerized is a polyurethane, the material can favourably be prepared by first mixing all the constituents of the material, except for the organic polyisocyanates. The sulphur is advantageously used in the form of powder sulphur such as flowers of sulphur, intimately mixed with the hydroxyl compounds. It is also possible for the sulphur to be used in liquid form and for it to be mixed with the hydroxyl compounds, or for sulphur in piece form to be melted at about 120° C. in the hydroxyl compounds and to be mixed therein. The other constituents, except for the organic polyisocyanates, are also mixed with the hydroxyl compounds at a temperature of from 10 to 130° C.; it is preferable for the mixing operation to be performed at a temperature of at least 70° C., under a pressure which is lower than atmospheric pressure, in order to cause the elimination of water which may be contained in the constituents. The remaining traces of water can be removed by the addition of a dehydrating agent such as a dehydrating molecular sieve or a hydrolysable compound such as titanium tetrachloride or aluminium trichloride; the amount of dehydrating agent to be used may be calculated in known manner from measurements of the amount of water to be removed.

The resulting composition is cooled if necessary, and then mixed with the polyisocyanates, at a temperature of from 10° to 80° C.; the resulting mixture is then cast in the mould or in the internal cavities of the strong walls, where it hardens by reaction between the hydroxyl compounds and the organic polyisocyanates; in order to reduce the duration of the reaction, it is possible for one or more catalysts which promote the reaction between the polyisocyanates and the hydroxyl compounds such as organic compounds of tin, in particular stannous octoate or dibutyl-tin dilaurate, or amino catalysts, to be added to the mixture.

In an alternative form, the material of the invention may also be used in the form of a concrete which is produced by using the mixture of the constituents, as described above, for encasing solid bodies of dimensions of from 0.5 to 20 mm, in a proportion which can reach 85% by weight with respect to the whole. Such solid bodies may comprise sand, gravel, small balls of vermiculite, mica or glass, or crushed plastics material waste or rubber waste. The concretes may be prepared before casting or may be produced by casting the mixture of the constituents, except for the solid bodies, in moulds or in the cavities of the fire arresting walls, which are previously filled with solid bodies.

The materials of the invention enjoy a group of properties which make them particularly advantageous for the production of strong walls which are required to resist burglary. Indeed, the provide good resistance to penetration by a blowpipe flame, in particular when they contain halogenated, phosphorus-bearing and/or phosphohalogenated compounds which cause the blowpipe to be repeatedly extinguished. In addition, during the operation, gas and/or fumes are emitted, which considerably hinder the operator. Particularly when they contain polyurethanes, these materials also have mechanical properties, in particular surface hardness of at least 70 Shore A and a modulus of elasticity under tension of at least 100 daN/cm$^2$, and adhesion properties, which make it difficult to pierce them, cut them or pull out them.

COMPARATIVE EXAMPLE C1

Using a 10 liter stainless steel reaction vessel provided with a mechanical agitator of the screw type and a double-jacket heating and cooling device, there are introduced 4500 g of a product of polyaddition of propylene oxide on glycerol with an equivalent weight of 280, and 5300 g of chalk in the form of fine powder. The constituents are mixed and the mixture is raised under vacuum to a temperature of 90° C. for a period of 1 hour 30 minutes, the residual pressure being 100 millibars. 200 g of powder with a molecular sieve of quality 4 Angströms and 1 g of dibutyl-tin dilaurate are then added.

The mixture is cooled to a temperature of 25° C. and 2800 g of crude MDI (crude 4, 4'-diphenylmethane-diisocyanate), wherein the content by weight of isocyanate groups 31%, is added. The isocyanate number is:

$$\frac{0.31 \times 2\ 800 \times 280}{42 \times 4\ 500} = 1.28.$$

The mixture is then moulded in an open mould which has a section of 15 cm × 15 cm and a height of 2.5 cm.

After hardening for 10 days at a temperature of 25° C., the sample is subjected to the tests set out below.

COMPARATIVE EXAMPLE C2

The same constituents as in Comparative Example C1 are used, except that 1000 g of chalk is replaced by the same weight of chlorinated paraffin containing 50% of chlorine by weight.

After hardening for 10 days at 25° C., the sample is subjected to the tests described hereinbelow.

EXAMPLES 1 TO 5

The same constituents as in Comparative Example C1 are used, except that the chalk is partially replaced by flowers of sulphur and, in some cases, by chlorinated or phosphochlorinated compounds, the nature and the quantities of which are set forth in Table I.

After hardening for 10 days at a temperature of 25° C., the samples are subjected to the tests described hereinbelow.

TESTS

The samples are placed on a surface measuring 15 cm × 2.5 cm, the surface which measures 15 cm × 15 cm being disposed vertically. The centre of the vertical face is attacked by means of an oxy-acetylene blowpipe, the flame of which is placed perpendicularly to the sample and at a distance of 5 mm therefrom. Measurements are taken in respect of the speed of penetration of the flame, the loss in weight of the sample per minute and the frequency at which the blowpipe is extinguished (number of extinctions of the blowpipe divided by the total duration of the test).

The results which are set out in Table I show that the sulphur considerably reduces the speed of penetration of the flame; in addition, the sample of Example 2 which contains about 30% of sulphur by weight resulted in fouling or clogging of the blowpipe and termination of the test. The presence of chlorinated compounds, in particular trichloropropylphosphate, causes the blowpipe to be repeatedly extinguished, so that it has to be re-lit.

ols, glucosides, alkanolamines or polyamines having from 3 to 8 hydrogen atoms capable of reacting with the alkylene oxides.

4. A process for the production of the composition set forth in either one of the preceding claims, which comprises mixing, at a temperature of from 10° to 130° C., all the constituents of the material except for the organic polyisocyanates and then, with or without previously removing water and with or without cooling the

TABLE I

| Example | Chalk (g) | Sulfur (g) | Chlorinated paraffin with 50% of Cl (g) | Trichloropropylphosphate (g) | Speed of penetration of the flame (mm/min) | Loss in weight (g/min) | Number of extinctions of the blowpipe during the test | Duration of the test (min) | Remarks about the opening |
|---|---|---|---|---|---|---|---|---|---|
| C1 | 5300 | 0 | 0 | 0 | 16 | 8 | 0 | 1min30s | Large conical hole |
| C2 | 4300 | 0 | 1000 | 0 | 6 | 6 | 1 | 4min15s | Large conical hole |
| 1 | 3800 | 1500 | 0 | 0 | 4 | 6.5 | 0 | 6 | Medium hole, charry |
| 2 | 2300 | 3000 | 0 | 0 | 2.2 | 2 | 0 | 11min30s | Small hole, charry |
| 3 | 800 | 4500 | 0 | 0 | 0.8 | 1.2 | 2 | 25 | The burnt depth is only 20 mm after 25 minutes |
| 4 | 1300 | 3000 | 1000 | 0 | 1.6 | 2 | 4 | 16 | Small charry hole |
| 5 | 1300 | 3000 | 0 | 1000 | 1.3 | 2.2 | 8 | 15 | The burnt depth is only 20 mm after 15 minutes |

We claim:

1. Composition for filling internal cavities in strong walls and doors having good resistance to mechanical stresses and to heat, consisting of 30 to 70 parts by weight of polyurethane resin forming components:
   from 10 to 60 parts by weight of divided elemental sulphur,
   from 0 to 15 parts by weight of flame and heat retardants in the form of halogenated compounds selected from the group consisting of chlorinated paraffin, chlorinated diphenyls and dibromopropanol.

2. A composition as claimed in claim 1, in which the substance which can be polymerized is constituted by a polyurethane which is produced by the reaction on the one hand of one or more organic polyisocyanates and on the other hand one or more compounds comprising from 3 to 8 atoms of labile hydrogen per molecule, the mean equivalent weight of which is from 100 to 400 such compounds being reacted with the polyisocyanates in amounts such that the isocyanate number is from 1 to 1.5.

3. A composition as claimed in claim 2, which is produced from, as compounds comprising from 3 to 8 labile hydrogen atoms per molecule, polyether-polyols resulting from the addition of propylene oxide and with or without ethylene oxide on compounds such as polyresulting composition, mixing said latter at from 10° to 80° C. with the organic polyisocyanates with or without the presence of one or more catalysts for promoting the reaction between the polyisocyanates and the hydroxyl compounds.

5. A process as claimed in claim 1 wherein the sulphur is used in the form of powder flowers of sulphur.

6. A process for the production of walls comprising filling internal cavities of such walls of the composition of claims 1, 2 or 3 containing up to 85% by weight of solid bodies of from 0.5 to 20 mm in size.

7. The process which comprises casting the mixture of the constituents of the composition of claim 1 in the internal cavities of the strong walls.

8. Composition as claimed in claim 1 in which the divided sulpher is finely divided sulpher present in an amount within the range of 20-30 parts by weight.

9. Composition as claimed in claim 1 in which the halogenated compounds are present within the range of 5-10 parts by weight.

10. Composition as claimed in claim 1 in which the powdery fillers, liquid fillers and pigments are present in an amount within the range of 5-25 parts by weight.

11. Composition as claimed in claim 2 in which the mean equivalent weight per molecule is within the range of 200-300.

* * * * *